United States Patent [19]

Eldridge

[11] Patent Number: 4,567,814
[45] Date of Patent: Feb. 4, 1986

[54] INTERCHANGEABLE CONNECTOR AND DIAPHRAGM ASSEMBLY

[75] Inventor: John D. Eldridge, Newport Beach, Calif.

[73] Assignee: Jodel Associates, Inc., Newport Beach, Calif.

[21] Appl. No.: 549,263

[22] Filed: Nov. 4, 1983

[51] Int. Cl.⁴ ............................................. F01B 19/00
[52] U.S. Cl. ........................................ 92/99; 92/48; 403/263; 403/375
[58] Field of Search .................. 92/48, 99, 37, 100; 403/261, 263, 375, 376, 379, 396, 399; 91/533

[56] References Cited

U.S. PATENT DOCUMENTS

| | | | |
|---|---|---|---|
| 1,048,947 | 12/1912 | Cornish | 92/48 |
| 1,160,321 | 11/1915 | Rice | 92/48 |
| 2,337,455 | 12/1943 | Davis | 92/48 |
| 2,649,843 | 8/1953 | Province | 92/48 X |
| 2,976,085 | 3/1961 | Grogan | 92/48 X |
| 3,477,346 | 11/1969 | Slavin et al. | 92/99 X |
| 3,709,461 | 1/1973 | Johnson | 92/48 X |
| 3,777,625 | 12/1973 | Andres | 92/48 |
| 3,838,630 | 10/1974 | Kobelt | 92/99 X |
| 4,334,838 | 6/1982 | Fesslar et al. | 92/99 X |

Primary Examiner—Paul E. Maslousky
Attorney, Agent, or Firm—Knobbe, Martens, Olson & Bear

[57] ABSTRACT

A connector and diaphragm assembly can be interchangeably used in either of two types of vacuum-actuated automobile control systems. The connector which is seated in the closed end of a bell-shaped diaphragm is, in turn, connected to one of two types of linking elements that operate the control system. Deflating the diaphragm moves the connector thereby moving a linking element into one of two positions. The connector has a recessed neck portion and a head with a threaded hole therein. In a first automobile control mechanism, the recessed neck receives a forked linking element. In a second automobile control mechanism, the threaded opening of the connector receives a threaded rod which serves as the linking element. The same connector can be interchangeably employed with either type of linking element.

8 Claims, 5 Drawing Figures

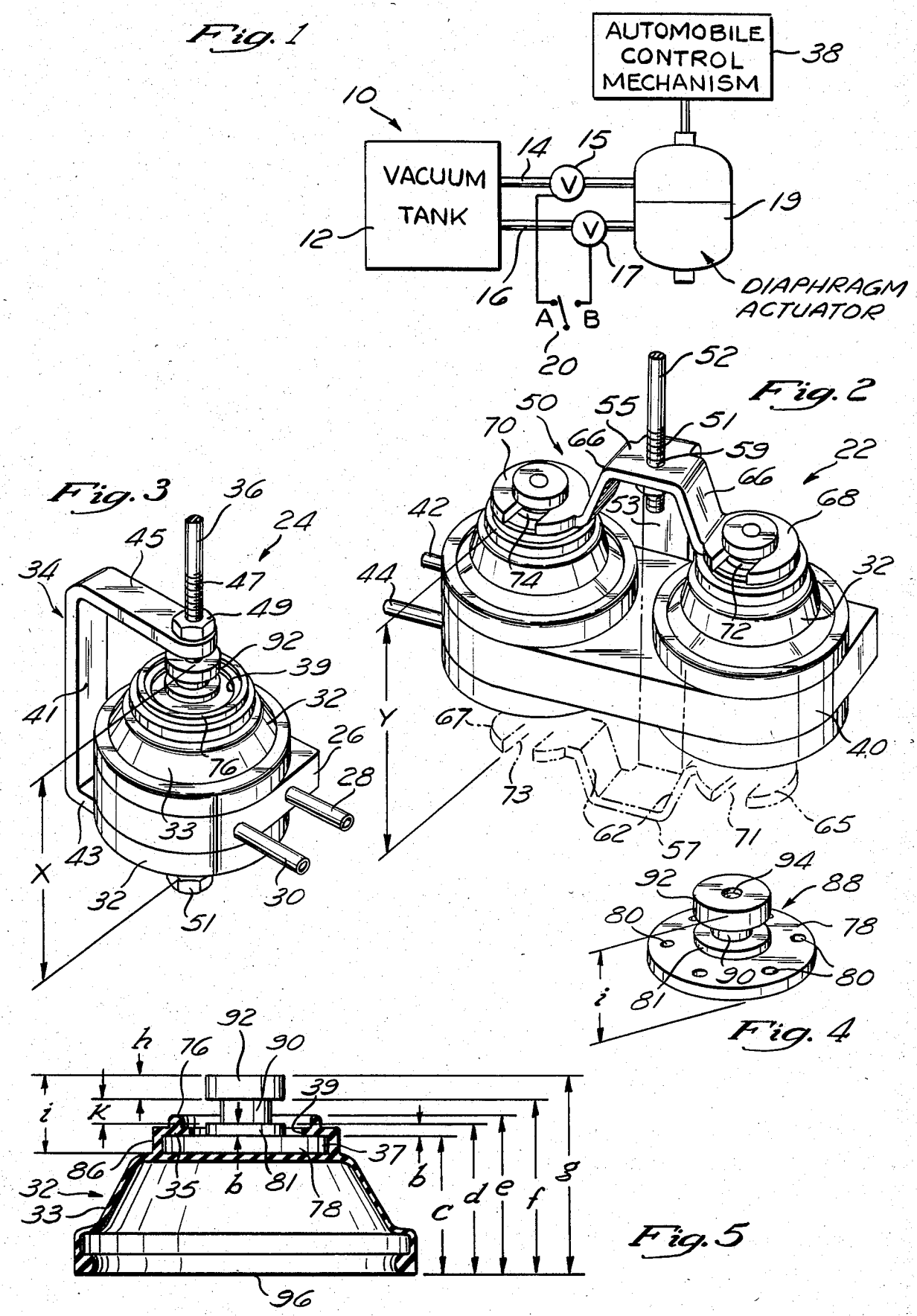

INTERCHANGEABLE CONNECTOR AND DIAPHRAGM ASSEMBLY

BACKGROUND OF THE INVENTION

This invention relates to a diaphragm and connector assembly for vacuum-actuated automobile control systems. Door lock systems for automatically locking and unlocking the doors are a common example of such a control system featured in many automobiles.

In both of two known automobile control systems, a vacuum tank provides suction in either one of two output tubes. An electrical switch which is accessible to the occupant of the automobile controls a valve on the vacuum tank. Pushing the switch in one direction causes the vacuum tank to remove air through one of the tubes and pushing the switch in the other direction causes the valve to expose the first tube to the atmosphere and depressurize the second tube. The tubes are connected to a diaphragm actuator which in turn is linked to the automobile control such as a door lock mechanism. The air lines and the link between the diaphragm actuator in the automobile control system are setup such that when air is pumped from the first tube, the automobile control such as a door lock, is urged into one position by the diaphragm actuator. When the air pump removes air from the second tube, the diaphragm actuator urges the door lock toward another position.

The main difference between the two different control systems resides in the diaphragm actuators used. One type of diaphragm actuator uses a single pair of diaphragm elements while the other type uses a double pair of diaphragm elements. In the single pair diaphragm actuator, two diaphragms are disposed on opposing sides of a plastic form. The diaphragms are selectively depressurized, depending upon the position of the valve switch. A U-shaped bracket is attached to the closed end of each of the diaphragms. One end of the bracket is also attached to a linkage element which is, in turn, attached to the control system. A metal connector is seated within the closed, molded end of the diaphragm. The connector has a housing with an inner recess for holding a nut. The nut is kept from turning by the contoured walls of the housing. The top of the housing has an opening to permit access to the nut within the recess of the housing. The end of the U-shaped bracket has an aperture which is registered with the aperture in the connector housing. The linkage element is a threaded rod which is then extended through the apertures in the U-shaped bracket and connector housing into the nut. In this way, the linkage element is connected to the diaphragms through the metal connector and U-shaped bracket. Depressurizing of the diaphragms will, therefore, cause the U-shaped bracket to move up and down, thereby moving the connector and linkage rod with it and thereby, in turn, for example, locking or unlocking the door of a door lock mechanism.

Another type of diaphragm actuator operates in a very similar manner except that it uses two pairs of diaphragms instead of one. Each diaphragm pair is disposed in side by side relation on opposite sides of a plastic form. Each pair of diaphragms is selectively depressurized to move the door lock through a linkage element. Each of the four diaphragms has a metal connector seated within the closed end of the diaphragm. The door lock is connected to a rod which is, in turn, connected to a bracket assembly having two pair of bifurcated brackets. Each metal connector has a recessed neck portion for receiving one of the wings of the bracket assembly. Thus, as the diaphragms are depressurized, the connectors and bracket move up and down, which, in turn, moves the rod that operates the lock.

Occasionally, the rubber material of a diaphragm will become brittle and crack. Presently, if the owner of a car equipped with either of these types of diaphragm actuators finds that the diaphragms need to be replaced, his only recourse is to purchase an entire diaphragm actuator. No separate diaphragms or connectors are available. Additionally, even if separate diaphragms were available the diaphragm usable with the single pair actuator is not compatible with that used for the double pair actuator due to the difference in the connector structure.

There is, therefore, a need for a connector/diaphragm assembly which will operate interchangeably in either the single or double diaphragm actuator configuration.

SUMMARY OF THE INVENTION

The invention overcomes the above problems by providing a single bell-shaped diaphragm and connector assembly which is compatible with both the single and double pair diaphragm actuators.

The universal metal connector has a cylindrical base that is seated within the closed molded end of the diaphragm. Protruding above the base and the end of the diaphragm are shoulder, neck and head portions of the connector. These portions are essentially cylindrical in form with the diameter of the neck portion being smaller than the diameter of the shoulder and head portions, forming an annular recess. The head portion has a threaded opening tapped therein.

In the single pair diaphragm actuator assembly, the threaded hole in the head of the universal connector receives the threaded linkage rod which is also threaded through the U-shaped bracket spanning the pair of diaphragms. Thus, the rod is threadably connected to the diaphragms through the connector and bracket structure.

In the double pair diaphragm actuator assembly, the neck portion of the connector receives the forked elements. The forked elements are, in turn, connected to the bracket arm. A linkage element is connected to the bracket. Thus, the linkage arm moves with the deflation of the diaphragm through the connector/bracket assembly.

Different sized diaphragms may be used by adjusting the dimensions of the connector head and shoulder portions so that the connector is still compatible with both a single diaphragm actuator and a double diaphragm actuator connector and diaphragm combination. For example, increasing the thickness of the shoulder will increase the distance the neck portion protrudes above the diaphragm, thereby varying the point at which the neck portion will receive the forked bracket element. Moreover, varying the thickness of the head portion will vary the overall height of the connector/diaphragm assembly without varying the distance the neck portion protrudes above the diaphragm. This means that the overall height of the diaphragm/connector assembly can be varied for a single actuator assembly without varying the point at which the neck portion receives the forked bracket element in a double actuator assembly.

The result is a connector and diaphragm assembly which can be used interchangeably in either the single or double pair locking mechanisms. Since both the diaphragm and connector are completely interchangeable, repair is exceedingly simple and efficient, as well as being much less costly.

BRIEF DESCRIPTION OF THE DRAWINGS

FIG. 1 is a schematic drawing of a vacuum-actuated automatic control system;

FIG. 2 is a perspective view of a double pair diaphragm actuator with the connector and diaphragm assembly of the present invention;

FIG. 3 is a perspective view of a single pair diaphragm actuator with the connector and diaphragm assembly of the present invention;

FIG. 4 shows the connector of the present invention;

FIG. 5 is a sectional view of the diaphragm and connector assembly of the present invention.

DETAILED DESCRIPTION OF THE PREFERRED EMBODIMENT

Referring now to FIG. 1, a schematic drawing of an automobile control system 10 is shown. Such control systems are used in many automobiles. The invention is intended to be applicable to any diaphragm and connector assembly where similar problems of substitution of one diaphragm for another are encountered.

The automobile control system generally includes an vacuum tank 12 which has two air tubes 14,16 extending therefrom. The vacuum in the vacuum tank 12 is produced by the intake manifold of an automobile. One of two valves 15,17 in the two air tubes 14,16 are activated by a switch 20 located conveniently in the passenger compartment of the car. Typically, the switch 20 has two positions A,B. When the switch 20 is pushed to one position, one valve opens one of the two air tubes to the vacuum tank 12. The valve in the other air tube remains closed to the vacuum tank 12 but open to the atmosphere. Thus, in the first position A, the switch 20 opens valve 15 in the air tube 14 such that it produces a vacuum in the first tube 14 and leaves valve 17 in the second tube 16 closed to the vacuum tank 12 but exposed to the atmosphere. In the second position B, the electric switch 20 opens valve 17 in air tube 16 which produces a vacuum in the second tube 16 while the other valves 15 in air tube 14 is closed. Thus, the switch 20 in the passenger compartment has two positions which activate the valves 15, 17 such that one air tube always remains depressurized while the other remains closed. The switch 20 controls which air tube is depressurized at a particular point in time. Flipping the switch depressurizes the opposite air tube.

As can be seen from FIG. 1, the two tubes 14,16 are connected to a diaphragm actuator 19 which is, in turn, connected to the automobile control mechanism 38. Depending upon whether the switch 20 is in the A or B position, the actuator 19 places the control mechanism into one of two positions.

It should be understood that the system shown in FIG. 1 is known. Moreover, it should be understood in the following detailed description of the diaphragm actuators, that the diaphragm/connector assembly is the novel portion of the structure. However, for a clear understanding of the contribution provided by the inventive diaphragm/connector assembly, it is necessary to have a complete description of the entire actuator structure.

FIG. 2 shows a double pair diaphragm actuator 22 and FIG. 3 shows a single pair diaphragm actuator 24. Referring first to the single pair diaphragm actuator 24 of FIG. 3, the actuator is constructed of an actuator body 26 formed of molded plastic. Opposite sides of the body 26 are cup-shaped forming oppositely disposed cavities. The lips of each cup are formed of protruding annular rims. (Not shown) A first diaphragm 32 is secured about the first upstanding annular rim and a second diaphragm (not shown) is secured about the second oppositely located upstanding annular rim. Two tubes 28,30 extend through the outer wall of the plastic body 26. The tube 28 extends into the upper half of the body and the tube 30 extends into the lower half. The first tube 28 communicates with the upper cavity in the plastic body 26 and the second tube 30 communicates with the lower cavity in the plastic body 26. When the diaphragms are in place, they form upper and lower sealed chambers with the plastic body 26.

Referring to FIG. 5, the diaphragm 32 is formed of an integral piece of molded rubber material. However, the diaphragm 32 may be conceptualized as having several component elements. The diaphragm 32 has a bell-shaped base 33 forming an open end 96. The diameter of the end 96 is slightly less than the diameter of the annular rim (not shown) located on the molded plastic body 26. An annular wall 86 extends vertically upward from the base 33. The wall 86 is of a smaller diameter than the base 33. An annular rim 35 extends at right angles to the wall 86. The annular rim 35 forms a circular opening 39 at the top of the diaphragm 32. The base 33, the wall 86, and the rim 35 form a cavity 37. An annular rib 76 extends upwardly from the mid-section of the rim 35.

Referring to FIGS. 4 and 5, a connector 88 is shown formed of an integral metal such as aluminum. Although an integral piece, the connector 88 may be conceptualized as comprising several components. The connector 88 has a base 78, a shoulder 81, a recessed neck 90, and a head 92. The base 78 has apertures 80 around the outer periphery. The shoulder 81 which sits on the base 78 is a thin, cylindrical portion with a diameter slightly less than half that of the base 78. Atop the shoulder 81 is the recessed neck 90. The recessed neck 90 is also cylindrical and has a diameter less than that of the shoulder 81 or the head 92. The head 92 of the connector 88 connects to the neck 90 and is approximately the same diameter as the shoulder 81. A threaded hole 94 passes through the center of the head 92 and extends through the recessed neck 90.

Referring to FIG. 5, the diaphragm connector assembly will now be described. The diaphragm 32 is molded around the base 78 of the connector 88 such that the base 78 fits snugly within the cavity 37. During manufacture, some of the rubber of the flexible diaphragm 32 is molded into the apertures 80 of the base 78. These apertures 80 aid in bonding the connector 88 to the diaphragm 32. It should be understood that the threaded hole 94 in the head 92 of the connector 88 does not pass through the entire length of the connector 88. The base 78 of the connector 88 is solid thereby preventing the rubber of the flexible diaphragm 32 from covering the threads inside the hole 94 of the connector 88 when the diaphragm 32 is molded to the base 78 during manufacture. As can be seen in FIG. 5, the base 78 of the connector 88 seats flush against the base portion 33 of the diaphragm 32.

In FIG. 5, the heights (thicknesses) of the top of the base 78, the top of the shoulder 81, the top of the rib 76, the top of the neck 90, and the top of the head 92 from the open end 96 of the diaphragm 32 are referred to as lengths c, d, e, f and g respectively. The overall height (thickness) of the connector 88 is referred to as dimension i. Moreover, the thickness of the shoulder 81, (length d minus length c) is referred to as b. The thickness of the neck 90 (length f minus length d) is referred to as k, and the thickness of the head 92, (length g minus length f) is referred to as h. The height e of the rib 76 must be greater than the height d of the shoulder 81 yet less than the height f of the neck 90. In other words, the height of rib 76 is such that the rib 76 will be at a level equivalent to the neck portion 90.

Referring again to FIG. 3, the structural relationship of the diaphragm/connector assembly with the actuator combination will now be described. The single diaphragm actuator has a U-shaped bracket 34 spanning the opposed diaphragms 32 comprising a bottom 41 and two arms 43,45 extending at right angles therefrom. Each arm 43,45 has an aperture (not shown) passing through and proximate to the outer end or tip. A dimension X equals the distance between the two arms 43,45, not including the thicknesses of the arms 43,45. The length of the arms 43,45 allows a clearance with the plastic body 26 sufficient to permit easy vertical movement of the bracket 34. The linkage element 36 is a metal rod with a threaded end 47.

The connection of the bracket 34 and the linkage element 36 with the diaphragm/connector assembly will now be described. The apertures of the brackets 43,45 are registered with the threaded hole 94 of the connector 88. Referring first to the upper diaphragm assembly, the threaded end 47 of the linkage element 36 passes through the aperture in the bracket arm 45 and is threaded into the hole 94. The linkage element 36 is further secured to the bracket arm 45 by means of a locking nut 49 located above and twisted flush against the arm 45 of the bracket 34. Referring to the lower diaphragm assembly, a common bolt 51 passes through the aperture in the bracket arm 43 and is threaded into the hole 94 of the lower connector (not shown). It should be understood that the linkage element 36 is in turn connected to the automobile control mechanism 38 shown in FIG. 1.

In operation, when the switch 20 is placed in the first position A, the valve opens and produces a vacuum in the first tube 28 of the diaphragm actuator. This deflates the first (upper) diaphragm 32 pulling the U-shaped bracket 34 and the linkage element 36 down away from the automobile control mechanism 38, thereby inflating the lower diaphragm. This movement, for example, may lock a door. Upon deflation of the upper diaphragm 32, the base 78 of the connector 88 will seat flush against the bottom of the cup of the plastic body 26, with only the thin rubber wall of the diaphragm separating the connector 88 and the body 26.

When the switch 20 is moved to the second position B the valve in air tube 28 is closed and air tube 28 is opened to the atmosphere. Meanwhile, the valve in air tube 30 is opened to the vacuum tank 12, which in turn deflates the second (lower) diaphragm (not shown). When the second (lower) diaphragm is deflated, the U-shaped bracket 34 moves up toward the automobile control mechanism 38. This, for example, may unlock a door.

Referring to FIG. 2, the double pair diaphragm actuator 22 will now be described. As in the single diaphragm pair actuator 24, the double pair diaphragm actuator 22 is composed of a body 40 formed of molded plastic. The body 40 has two pair of cups (not shown) forming four cavities. Each pair of cups are in side-by-side relation and are oppositely disposed on upper and lower sides of the body 40. Each cup has a circular rim for sealing engagement with the diaphragms 32. As in the single pair diaphragm actuator, two tubes 42,44 pass through the wall of the plastic body 40 and feed into the center of the body. The open ends 96 of the first and second bell-shaped diaphragms 32 are attached respectively to the annular rims of the upper side of the base 40 forming two sealed chambers. Likewise, the open ends of a third and fourth bell-shaped diaphragms (not shown) attach to the annular rims on the lower side of the base 40, forming two sealed chambers opposite the above described chambers. Each of the diaphragms 32 has the connector 88 seated therein as fully described in reference to FIG. 5. The first tube 42 communicates with the cavities formed on the upper side of the body 40 and the second tube 44 communicates with the oppositely disposed cavities formed on the lower side of the body.

A bracket 50 consists of a U-shaped metallic piece having a bottom 53 and two arms 55,57 extending at right angles therefrom. Located on the upper arm 55 of the bracket 50 is a threaded hole 59. Two symmetrical wings 66, extend from the arm 55 and angle down at about 45° to two elements 68 and 70, having U-shaped slots 72 and 74 therein. The two elements 68,70 are in a plane parallel to the upper and lower arms 55,57 of the bracket 50.

The lower half of bracket 50 mirrors the upper half of bracket 50 with two symmetrical wings 62 angling up from the lower arm 57 at approximately 45°. Attached on the ends of the wings 62 are two elements 67,65 having U-shaped slots 73 and 71 therein. A dimension Y equals the distance between the upper elements 68,70 and the lower elements 65,67, not including the thickness of the elements 65,67,68,70. The length of the arms 55,57 allow a clearance with the body 40 sufficient to permit easy vertical movement of the bracket 50.

In operation, the bracket 50 connects to all four diaphragm/connector assemblies. The recessed neck 90 of each connector 88 receives the slots 71,72,73,74 of the elements 65,67,68,70. The slots 71,72,73,74 are of a dimension slightly wider than the diameter of the neck 90 of the connector 88. The thickness of the elements 65,67,68,70 is slightly less than the height k. The annular rib 76 located on top of the annular rim 35 of the diaphragm 32 fits between the base 78 of the connector 88 and the elements 65,67,68,70. The resilient rubber material of the rib 76 provides a vertical force extending toward the head 94 of the connector 88 which holds the bracket 50 in place. When the upper diaphragms are depressurized, the bracket 50 moves in one direction and when the lower set of diaphragms are depressurized, the bracket 50 moves in the opposite direction. As discussed above with respect to the single pair actuator, when any one of the diaphragms 32 is deflated, its connector will press against the bottom of the cup of the plastic body 40. When one valve in an air tube is open, the valve in the other air tube is closed to the vacuum tank 12 and, as a result, one or the other set of chambers is depressurized.

The bracket 50 is connected to a linkage element 52 which can be substantially the same as the linkage element 36 used for the single pair actuator 24. This element 52 consists of a rod with a threaded end 51. The threaded end 51 fits within the threaded hole 59 in the upper arm 55 of the bracket 50. The other end of the rod 52 is connected to the automobile control mechanism 38 and, like its counterpart in the single pair diaphragm actuator 24, the rod and the double pair diaphragm actuator moves to one of two positions which may, for example, unlock or lock a door depending upon which of the sets of diaphragms have been depressurized.

In operation, the dimensions X and Y can be more precisely defined relative to dimensions of the parts between the bracket arms of assembled diaphragm actuators. The dimension X has previously been defined as the distance between the two arms 43,45 of the bracket 34. The dimension X can also be defined in relation to the parts between the arms 43,45 on an assembled diaphragm actuator. FIG. 3 depicts a single pair diaphragm actuator 22 with a deflated lower diaphragm. When a chamber is depressurized, the connector 88 seats flush with the bottom of the cup (not shown) on the lower side of the plastic body 26. The height of the connector 88, depicted in FIG. 5 as dimension i, therefore, comprises part of the distance X.

Referring again to FIG. 3, opposite the deflated lower diaphragm is a fully extended diaphragm on the upper side of plastic body 26. FIG. 5 depicts the dimension of a fully extended diaphragm as g. Because the bracket 34 is attached to the top of the diaphragm connector, the distance g also comprises part of the dimension X.

In addition to the fully extended diaphragm and the deflated diaphragm, a portion of the plastic body 26 comprises the remaining part of the distance X. A dimension $P_1$ (not shown) defines the thickness of the plastic body 26 that remains between the fully extended (upper) diaphragm and the deflated (lower) diaphragm. As thus defined, $P_1$ is the distance from the lower most point of the upper diaphragm 32 about the annular rim (not shown) to the bottom of the base 78 of the connector 88 on the deflated lower diaphgram. So defined, $P_1$ can be considered to include the thickness of the wall of the deflated diaphragm between the connector and the cup of the plastic body 26.

Thus, the distance X from the lower arm 43 to the upper arm 45 of bracket 34 consists of the height i of the connector 88, an artificially defined "thickness" of the plastic body $P_1$, and the height of a fully extended diaphragm, g. Thus, in mathematical terms X can be expressed as follows:

$$X = i + P_1 + g \qquad (1)$$

Similarly, the distance Y, which has previously been expressed as the distance between two elements 67,70 or 65,68 on bracket 50, can be expressed in terms of the parts of the double pair actuator that span the dimension Y.

FIG. 2 depicts a double pair diaphragm actuator. In operation when the lower diaphragms (not shown) would be deflated, the connectors 88 of both the lower deflated diaphragm connector assemblies would be seated in the bottom of each respective cup (not shown) on the lower side of the plastic body 40. Thus, part of the dimension Y is comprised of a portion of the length of the connector 88. The whole dimension i is not included since elements 65,67 are attached below the top of the connector 88 and about the recessed neck 90. Consequently, both the thickness of the head 92, depicted as dimension h, and the thickness of the recessed neck 90, depicted as dimension k, are subtracted from the dimension i to arrive with the proper dimension for the portion of the connector 88 above the cup for the deflated diaphragms in a double pair actuator assembly. Therefore, the distance between a cup on the lower side of the plastic body 40 and the lower bracket element 65 or 67 can be expressed mathematically as $i - (k+h)$.

Directly opposite each lower deflated (not shown) diaphragm connector assembly is a fully extended diaphragm connector assembly on the upper side of plastic body 40 connected to the elements 68 or 70 of the bracket 50. The fully extended diaphragms also comprise part of the distance Y. The elements 68,70 attach about the recessed neck 90 of each diaphragm connector. Therefore, subtracting the thickness of the head 92, depicted as dimension h, and the thickness of the recessed neck 90, depicted as dimension k, from the dimension g of the fully extended diaphragm connector assembly, yields the height of the fully extended diaphragm above the plastic body 40 which is included in distance Y. Thus the distance included in the dimension Y can be expressed as $g - (k+h)$.

The remaining portion of the dimension Y consists of a portion of the plastic body 40. A dimension $P_2$ (not shown) defines the thickness of the plastic body 40 measured from the lower most point of the upper diaphragm 32 about the annular rims (not shown) to the bottom of the base 78 of each connector 88 (not shown) on the deflated lower diaphragms. Again as so defined, $P_2$ includes the thickness of the wall of the deflated diaphragm between the connector and the cup of the plastic body 40.

Therefore, the distance Y equals the length of the connector 88 below the cup seated in the lower cup of plastic body 40, an arbitrarily defined "thickness" of the plastic body, and the length of an extended diaphragm connector above the plastic body. Mathematically, this is expressed as:

$$Y = i - (k+h) + P_2 + g - (k+h) \qquad (2)$$

This can be simplified to:

$$Y = i + P_2 + g - 2(k+h) \qquad (3)$$

The unique feature of this invention is that the diaphragm/connector assembly can be used interchangeably on both the single pair and double pair diaphragm actuator. Thus, the dimensions of the diaphragm connector assembly, i.e. i and g, used in defining X are the same as those used in defining Y. Comparing the expressions for X and Y by subtracting equation (3) from equation (1) above yields:

$$X - Y = (i + P_1 + g) - [i + P_2 + g - 2(k+h)] \qquad (4)$$

which can be simplified to:

$$X - Y = P_1 - P_2 + 2(k+h) \qquad (5)$$

where:
X = the distance between the arms 43,45 of the bracket 34
Y = the distance between a set of opposed elements 70,67 or 65,68

$P_1$ = the thickness of plastic body 26 of a single pair diaphragm actuator 24
$P_2$ = the thickness of plastic body 40 of the double pair diaphragm actuator 22
k = the thickness of the neck 90 of the connector 88
h = the thickness of the head 92 of the connector 88.

In a practical application, this mathematical relationship is most advantageously expressed in terms of h since, in most instances, the other dimensions are fixed. In a given repair situation the distances between the elements X and Y in both sets of brackets 34 and 50, are fixed by the manufacturer as are the thicknesses, $P_1$ and $P_2$ of the plastic bodies 26 and 40. The width of the elements 65,67,68,70, again fixed by the manufacturer, fixes the width k of the recessed neck 90. Algebraic manipulation of equation (5) above yields the following equation in terms of h:

$$h = (X - Y - P_1 + P_2 - 2k)/2 \quad (6)$$

With h so defined, the diaphragm/connector assembly can be used in both double and single diaphragm actuators.

Referring to FIG. 5, the thickness of the recessed neck 90, dimension k, is fixed by the thickness of the elements 65,67,68,70 of the bracket 50. The dimension d can be varied, such as by varying the thickness of the shoulder 81, to ensure that the neck 90 is of a height appropriate to receive the elements 65,67,68,70 of the bracket 50 of the double pair diaphragm actuator. Given a dimension d for the diaphragm/connector assembly, the thickness of the head, dimension h, must be as defined in equation (6) so that the diaphragm/connector assembly will be useable in the single pair diaphragm actuator. Thus the distance h controls the overall height of the diaphragm/connector assembly to ensure proper fitting within the bracket 34 in the single pair diaphragm actuator.

It should be understood that the thickness of the head, dimension h, has no affect upon whether or not the diaphragm/connector assembly will properly fit in the double pair diaphragm actuator. In order that the diaphragm/connector assembly fits between the elements 65,67,68,70 in the double pair diaphragm actuator the neck 90 must be of a height appropriate to receive the elements 65,67,68,70. The height of the neck 90 will be determined by the dimension d as shown in FIG. 5. Thus, the proper dimension d must be chosen in order that the neck 90 of the connector be of a proper height to receive the elements 65,67,68,70. In order that the diaphragm/connector assembly be interchangeable, given the selection of dimension d, the thickness of the head h must be as defined in equation (6) so that the diaphragm/connector assembly will fit between the arms 43,45 of the bracket 34.

The inventive diaphragm/connector assembly solves the problem of fixing a cracked diaphragm in an inexpensive manner. With the inventive diaphragm/connector assembly, a garage can now stock one diaphragm mechanism that will replace the diaphragm and connector on either a single pair diaphragm actuator or a double pair diaphragm actuator. Before the present invention, to fix either the single diaphragm actuator or double diaphragm actuator in the known control system, an entire actuator had to be replaced. The only replacement part that was available was a complete diaphragm actuator whether it was single or double pair. These replacement parts were very expensive since molding the body portions 26 and 40 of the single and double pair diaphragm actuators, is an expensive process. The diaphragm/connector assemblies, by contrast, are inexpensive to manufacture and as a result, can be replaced for a relatively nominal feee when compared to replacing the entire actuators.

What is claimed is:

1. A device comprising:
    a flexible bell shaped diaphragm having an open end, an outer closed end and a central axis extending through the center of the open and closed ends;
    a connector element fixed to the outer closed end of the bell shaped diaphragm;
    said connector element being cylindrical in shape and protruding from the outer closed portion of the bell shaped diaphragm along the center axis of said diaphragm, said connector having a first means for receiving a first linkage element, said first means comprising an annular recess in the connector's mid-portion having two opposing surfaces, said two opposing surfaces being secured to prevent movement with respect to one another, and said connector having a second means for receiving a second linkage element, said second means comprising an empty threaded opening at an end of the connector element extending into and along the axis thereof whereby said connector may be interchangeably connected either exclusively to said first linkage element or exclusively to said second linkage element.

2. The device of claim 1 wherein said threaded opening is of a continuous length sufficient to provide a strong bond between the connector and the second linkage element when the second linkage element is threaded into said threaded opening.

3. The device of claim 1 wherein said threaded opening extends continuously through said connector to the mid-portion of said connector to provide a strong connection between said connector and said second linkage element when said second linkage element is threaded into said threaded opening.

4. The device of claim 1 further comprising means for maintaining said first linkage element in said first linkage receiving means, said maintaining means comprising a rib extending upwardly from said closed end of said diaphragm, said rib positioned to abut said first linkage element to assist in holding said first linkage element in said first linkage receiving means.

5. A method comprising:
    providing a plurality of identical diaphragm/connector assemblies, each assembly having a diaphragm and a connector element fixed to said diaphragm, said connector element being cylindrical in shape and protruding from an outer portion of said diaphragm, said connector having a first means for receiving a first linkage element, said first means comprising an annular recess formed in the connector's mid-portion, said connector having a second means for receiving a second linkage element, said second means comprising a threaded opening at said connector's end extending into and along the axis thereof;
    installing a first one of said diaphragm/connector assemblies in a first vehicle wherein said vehicle has said first linkage element, said installing step including connecting said first receiving means of said first one of said diaphragm/connector assemblies to the first linkage element while leaving the second receiving means free of any connections;

installing a second one of said diaphragm/connector assemblies in a second vehicle wherein said second vehicle has said second linkage element, said installing step including connecting said second receiving means of said second one of said diaphragm/connector assemblies to said second linkage element while leaving the first receiving means free of any connections.

6. The method of claim 5 further comprising the preliminary step of removing an old diaphragm/connector from the automatic door lock systems of each of said first and second vehicles; and wherein
said installing steps include replacing the removed diaphragms.

7. The device of claim 1 wherein said connector element is one piece.

8. The device of claim 1 wherein said threaded opening includes at least some threading which is near said end of the connector and beyond one of the two opposing surfaces of said recess.

* * * * *